United States Patent
Han

(10) Patent No.: US 12,411,495 B2
(45) Date of Patent: Sep. 9, 2025

(54) MOBILE ROBOT AND CONTROL METHOD THEREFOR

(71) Applicant: LG ELECTRONICS INC., Seoul (KR)

(72) Inventor: Sanggyu Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/785,544

(22) PCT Filed: Dec. 14, 2020

(86) PCT No.: PCT/KR2020/018228
§ 371 (c)(1),
(2) Date: Jun. 15, 2022

(87) PCT Pub. No.: WO2021/125717
PCT Pub. Date: Jun. 24, 2021

(65) Prior Publication Data
US 2023/0341866 A1    Oct. 26, 2023

(30) Foreign Application Priority Data
Dec. 20, 2019    (KR) .................. 10-2019-0172371

(51) Int. Cl.
G05D 1/00    (2024.01)
A47L 11/40    (2006.01)

(52) U.S. Cl.
CPC ........ *G05D 1/0234* (2013.01); *A47L 11/4011* (2013.01); *G05D 1/0214* (2013.01);
(Continued)

(58) Field of Classification Search
CPC .............. A47L 11/4011; A47L 2201/04; B25J 11/0085; B25J 9/1602; B25J 9/1664;
(Continued)

(56) References Cited

U.S. PATENT DOCUMENTS

| 2015/0032260 A1 | 1/2015 | Yoon et al. |
| 2018/0178391 A1 | 6/2018 | Naito et al. |

(Continued)

FOREIGN PATENT DOCUMENTS

| CN | 107730552 | 2/2018 |
| CN | 107981788 | 5/2018 |

(Continued)

OTHER PUBLICATIONS

Chinese Office Action dated Apr. 21, 2023 issued in Application No. 202080088762.5.

(Continued)

*Primary Examiner* — Charles J Han
(74) *Attorney, Agent, or Firm* — KED & ASSOCIATES, LLP

(57) ABSTRACT

In a mobile robot and a control method therefor according to the present disclosure, a plurality of mobile robots located in an area confirm the positions of other mobile robots and operate in cooperation with each other to cooperatively clean then area. One mobile robot moves to follow the position of another mobile robot, so that the mobile robots with different cleaning types cooperate to clean the area. Accordingly, the plurality of mobile robots can cooperatively perform cleaning without colliding within one area, and by combining or changing a plurality of position detection methods as needed, the position of another mobile robot can be easily calculated and the cleaning efficiency is greatly improved.

8 Claims, 9 Drawing Sheets

(52) U.S. Cl.
CPC ......... *G05D 1/0246* (2013.01); *G05D 1/0289* (2013.01); *A47L 2201/04* (2013.01)

(58) Field of Classification Search
CPC ...... B25J 9/1669; B25J 9/1682; B25J 9/1684; B25J 9/1697; G05B 2219/39146; G05B 2219/45098; G05D 1/0214; G05D 1/0234; G05D 1/0246; G05D 1/0289; G05D 1/0293
See application file for complete search history.

(56) References Cited

U.S. PATENT DOCUMENTS

| | | | |
|---|---|---|---|
| 2019/0212752 A1* | 7/2019 | Fong | .................... G05D 1/0274 |
| 2019/0339715 A1 | 11/2019 | Kwak et al. | |

FOREIGN PATENT DOCUMENTS

| | | |
|---|---|---|
| CN | 108227697 | 6/2018 |
| CN | 108724178 | 11/2018 |
| CN | 109688884 | 4/2019 |
| CN | 208851394 | 5/2019 |
| JP | 2013-223734 | 10/2013 |
| JP | 5896931 | 3/2016 |
| JP | 2017-021570 | 1/2017 |
| JP | 2018-106217 | 7/2018 |
| KR | 10-2006-0011822 | 2/2006 |
| KR | 10-2014-0156933 | 11/2014 |
| KR | 10-2016-0056559 | 5/2016 |
| KR | 10-2017-0129559 | 11/2017 |
| KR | 10-1854337 | 5/2018 |
| KR | 10-2019-0134969 | 12/2019 |
| KR | 10-2019-0134970 | 12/2019 |
| WO | WO 2016/076467 | 5/2016 |
| WO | WO 2018/201651 | 11/2018 |
| WO | WO 2019/057157 | 3/2019 |
| WO | WO 2020/017943 | 1/2020 |
| WO | WO-2020017943 A1 * | 1/2020 ........... A47L 9/2815 |

OTHER PUBLICATIONS

International Search Report dated Apr. 8, 2021 issued in Application No. PCT/KR2020/018228.
European Search Report dated Dec. 1, 2023 issued in Application No. 20903030.3.
Korean Office Action dated Mar. 20, 2025 issued in Application No. 10-2019-0172371.

* cited by examiner

MOBILE ROBOT AND CONTROL METHOD THEREFOR

CROSS-REFERENCE TO RELATED PATENT APPLICATIONS

This application is a U.S. National Stage Application under 35 U.S.C. § 371 of PCT Application No. PCT/KR2020/018228, filed Dec. 14, 2020, which claims priority to Korean Patent Application No. 10-2019-0172371, filed Dec. 20, 2019, whose entire disclosures are hereby incorporated by reference.

TECHNICAL FIELD

The present disclosure relates to a mobile robot and a method of controlling the same in which a plurality of mobile robots travel in an area and operate in cooperation with each other.

BACKGROUND ART

In general, a mobile robot travels by itself using a charging power to perform a designated operation within an area.

For example, a cleaning robot automatically cleans by inhaling foreign substances such as dust from a floor. A wet cleaning robot performs wet cleaning by moving in an area while wiping a floor surface. In some cases, the mobile robot may perform dry and wet cleaning by sucking foreign substances through a front side thereof and wiping through a cleaning cloth mounted at a rear side thereof.

The mobile robot may create a map of an area to be cleaned while driving in the corresponding area. The mobile robot may perform cleaning while driving based on the created map.

In addition, a plurality of mobile robots may travel in one area and perform a designated operation.

In the driving of a mobile robot, Korean Patent Application Publication No. 10-2014-0156933 discloses, as a method of determining a position of a mobile robot within an area, that a position of the mobile robot is determined by irradiating a point to a specific position on a ceiling through a pointer. Since the pointer is fixed, the mobile robot determines its position based on the pointer even while moving.

However, when a plurality of mobile robots drive in an area, a pointer irradiated to a fixed position of the ceiling may be used to determine a position in the area based on the pointer, but there is a limitation in that the plurality of mobile robots operate in conjunction with each other.

In addition, Korean Patent Application Publication No. 10-2006-0011822 discloses that a mobile robot moves along a pointer when a user irradiates a floor surface in an area. The pointer is moved by the user, and the mobile robot moves to a specific position along the pointer according to the user's intention.

However, in the case of moving the pointer, it may be used to guide the mobile robot by the user or the like, but since a pointer needs to be designated for each of a plurality of mobile robots to move the mobile robots, it is difficult to apply to the plurality of mobile robots. In addition, a relative distance of the pointer irradiated to the floor and moved by the user and the relative distance may be confirmed, but there is a limit because a position within the area cannot be confirmed.

Accordingly, when a plurality of mobile robots travel in one area, there is a need for a method of controlling the robots to operate in conjunction with each other without collision.

DISCLOSURE

Technical Problem

The present disclosure is to provide a mobile robot and a method of controlling the same in which a plurality of mobile robots operate in conjunction with each other within an area through position confirmation between the plurality of mobile robots traveling in the area.

The present disclosure is to provide a mobile robot and a method of controlling the same in which a mobile robot moves to follow a position of another mobile robot The present disclosure is to provide a mobile robot and a method of controlling the same in which mobile robots of different cleaning types move to follow positions through a cooperative mode to perform dry cleaning and wet cleaning.

The present disclosure is to provide a mobile robot and a method of controlling the same in which a position of another mobile robot is calculated using a plurality of position detection methods.

Technical Solution

In order to achieve the above purpose, a mobile robot and a control method thereof according to one embodiment of the present disclosure are characterized in that a plurality of mobile robots traveling in an area operates in conjunction with each other through confirmation of positions of other mobile robots to clean the area through cooperation.

The present disclosure is characterized in that mobile robots of different cleaning types cooperate to clean an area in such a way that one mobile robot moves to follow a position of another mobile robot.

The present disclosure is characterized in that while a mobile robot of a dry cleaning type travels and sucks foreign substances, a mobile robot of a wet cleaning type moves to follow a position of the dry cleaning type mobile robot and performs a wet cleaning.

The present disclosure is characterized in that a mobile robot irradiates a marker to indicate a position, and another mobile robot calculates the position through the indicated marker.

The present disclosure is characterized in that by receiving a position signal transmitted from any one of the mobile robots, a position of the corresponding mobile robot is calculated.

The present disclosure is characterized in that the position of another mobile robot is calculated by combining a plurality of position detection methods or changing the position detection methods.

The present disclosure is characterized in that by calculating a position of another mobile robot using a plurality of position detection methods, the position is calculated by changing the position detection method even when the position cannot be confirmed due to a distance between the mobile robots or an obstacle therebetween.

The present disclosure is characterized in that the position of another mobile robot is calculated by changing the position detection methods depending on the distance from another mobile robot, whether the marker is detected, or whether the position signal is received.

The present disclosure includes: a main body that travels in an area; an image acquisition unit configured to capture an image; a communication unit configured to receive a position signal transmitted from a first mobile robot to follow; a control unit configured to determine a position of the first mobile robot from the image acquired by the image acquisition unit or the position signal, and set a travel route with the position of the first mobile robot as a target point; and a driving unit configured to move the main body to follow the first mobile robot along the travel route, wherein the control unit determines the position of the first mobile robot using the acquired image or the position signal depending on a distance from the first mobile robot.

The present disclosure includes: a main body that travels in an area; an image acquisition unit configured to capture an image; a communication unit configured to receive a position signal transmitted from a first mobile robot to follow; a control unit configured to determine a position of the first mobile robot from the image acquired by the image acquisition unit or the position signal, and set a travel route with the position of the first mobile robot as a target point; and a driving unit configured to move the main body to follow the first mobile robot along the travel route, wherein the control unit determines the position of the first mobile robot from the acquired image when a distance to the first mobile robot is greater than or equal to a set distance, and when the distance to the first mobile robot is less than the set distance, the control unit receives the position signal of the first mobile robot to determine the position of the first mobile robot.

The present disclosure includes: a first mobile robot that travels while outputting a marker upward and transmitting a position signal; and a second mobile robot that follows the first mobile robot, wherein the second mobile robot calculates a position of the first mobile robot corresponding to a position of the marker from the acquired image including the marker, calculates the position of the first mobile robot from the position signal and determines the position of the first mobile robot using the acquired image or the position signal depending on a distance from the first mobile robot to follow the first mobile robot.

The present disclosure includes: a first mobile robot that travels while outputting a marker upward and transmitting a position signal; a second mobile robot that follows the first mobile robot, wherein the second mobile robot calculates a position of the first mobile robot corresponding to the position of the marker from the acquired image including the marker when a distance to the first mobile robot is greater than or equal to a set distance and, when the distance to the first mobile robot is less than the set distance, calculates the position of the first mobile robot from the position signal to follow the first mobile robot by changing position calculation methods depending on the distance from the first mobile robot.

The present disclosure includes: setting a cooperative mode; determining a position of a first mobile robot for cooperation; calculating a position of the first mobile robot using either an image including a marker output from the first mobile robot or a position signal transmitted from the first mobile robot; setting a travel route with the position of the first mobile robot as a target point; and moving the mobile robot to follow the first mobile robot along the travel route.

The present disclosure includes: detecting a first mobile robot by a second mobile robot; when a distance to the first mobile robot is greater than or equal to a set distance, capturing an image including a marker output from the first mobile robot and calculating a position of the first mobile robot based on a position of the marker extracted from the image; when the distance to the first mobile robot is less than a set distance, calculating a position of the first mobile robot by receiving the position signal of the first mobile robot; setting a travel route with the position of the first mobile robot as a target point; and moving the second mobile robot to follow the first mobile robot along the travel route.

Advantageous Effects

The mobile robot and the control method for the same according to the present disclosure can perform operations in conjunction with each other through confirmation of relative positions of a plurality of mobile robots even when the plurality of mobile robots travel within an area.

According to the present disclosure, a plurality of mobile robots can cooperatively perform cleaning without colliding within one area through the cooperative mode.

According to the present disclosure, the position of another mobile robot can be easily calculated by combining the plurality of position detection methods or changing them as necessary.

According to the present disclosure, by using the plurality of position detection methods, the mobile robot can calculate the position of another mobile robot and move to follow it by changing the position detection methods even when the position cannot be confirmed by an obstacle or the position signal cannot be received due to a distance to the another mobile robot greater than a certain value for charging or the like.

According to the present disclosure, cleaning efficiency can be improved by using a plurality of mobile robots in such a way that one mobile robot moves to follow another mobile robot.

According to the present disclosure, a plurality of mobile robots can simultaneously perform cleaning in one area, which improves the cleaning speed.

According to the present disclosure, a plurality of mobile robots perform cleaning using different cleaning methods through tracking movement through mutual positioning, which improves cleaning efficiency through synergy effect.

According to the present disclosure, it is possible to improve cleaning efficiency and provide a comfortable indoor environment.

MODE FOR DISCLOSURE

Figure 1A:
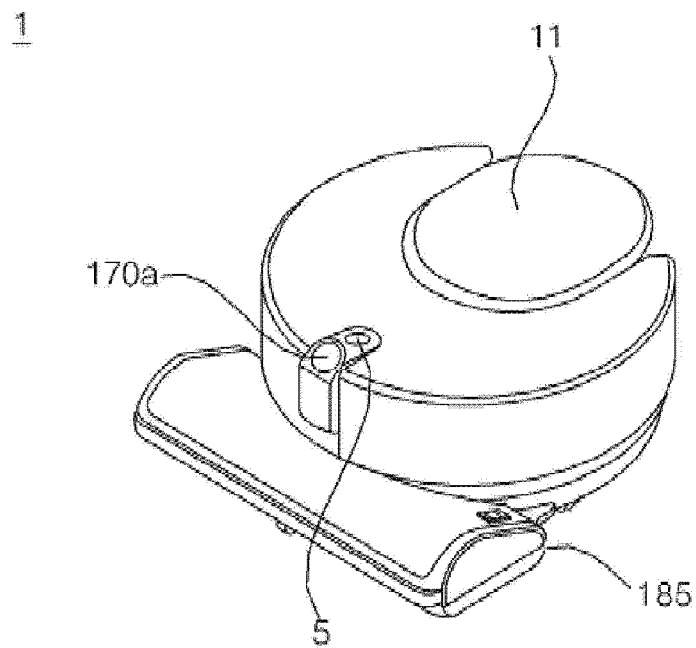
FIGS. 1A and 1B are perspective views showing mobile robots according to one embodiment of the present disclosure.

Advantages and features of the present disclosure and methods of achieving them will become apparent with reference to the embodiments described below in detail in conjunction with the accompanying drawings. However, the present disclosure is not limited to the embodiments disclosed below, but may be implemented in various different forms, and the present embodiments are merely provided so that the disclosure of the present disclosure is complete, and to completely inform those of ordinary skill in the art to which the present disclosure belongs of the scope of the disclosure, the present disclosure is defined by the scope of the claims. The same reference numerals refer to the same components throughout the specification. The control configuration of the present disclosure may be configured with at least one processor.

Figure 1B:
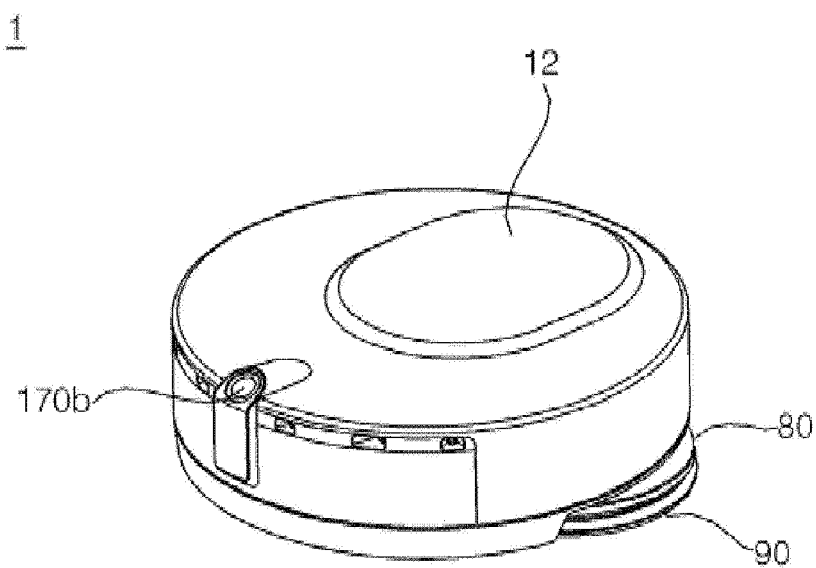

FIGS. 1A and 1B are perspective views showing a mobile robot according to one embodiment of the present disclosure.

FIG. 1A is a diagram illustrating a mobile robot 11 of dry cleaning type configured to remove foreign substances by sucking air.

As illustrated in FIG. 1A, the mobile robot 1, 11 may include a main body, a casing (not shown) forming an outer appearance and having therein a space for accommodating components constituting the main body, and a left wheel (not shown) and a right wheel (not shown) rotatably provided at the casing. In addition, the mobile robot includes a suction unit 185 disposed in the casing and formed to face a floor surface to suck foreign substances such as dust and garbage to perform cleaning.

In addition, the mobile robot 1, 11 stores charging power supplied from a charging stand (not shown) in a battery (not shown) and travels in an area.

As the left wheel and the right wheel of the mobile robot 1, 11 rotate, the main body moves along the bottom in the area. The main body 10 may include a driving unit (not shown) for driving the left wheel and the right wheel. The driving unit may include at least one driving motor.

The mobile robot 1, 11 includes the main body performing a designated operation, an obstacle detection unit (not shown) disposed on a front surface of the main body to detect an obstacle, and an image acquisition unit 170a for capturing an image.

The suction unit 185 may include a suction fan (not shown) for generating a suction force, and a suction port (not shown) through which air stream generated by rotation of the suction fan is sucked. The suction unit may include a filter (not shown) for collecting foreign substances from the air stream sucked through the suction port, and a foreign substance collecting container 189 in which foreign substances collected by the filter accumulate.

The suction unit 185 includes a rotating brush (not shown), and rotates and absorbs the air stream to assist in collecting foreign substances. The suction unit is configured to be detachable as necessary. The main body 10 is located at a front side of a bottom surface of the casing, and may be provided with multiple brushes (not shown) with a brush having radially extended multiple blades.

In addition, a wet mop cleaning unit may be detachably attached to the suction unit. The wet mop cleaning unit may be mounted at a rear surface of the suction port. In some cases, the wet mop cleaning unit may be configured separately from the suction unit and may be replaced and mounted at a position where the wet mop cleaning unit is fastened and fixed to the suction unit. The wet mop cleaning unit wipes the floor surface in the traveling direction while moving.

FIG. 1B is a diagram illustrating a wet cleaning type mobile robot 12 for cleaning a floor surface through rotation of a cleaning cloth 90. The same reference numerals are used for the same components as shown in FIG. 1A described above, and descriptions of the same components will be omitted.

As shown in FIG. 1B, the mobile robot 1, 12 according to one embodiment of the present disclosure moves within an area and removes foreign substances from the floor surface while traveling. In addition, the mobile robot 12 stores charging power supplied from the charging stand in a battery (not shown) and travels in the area.

The main body includes a casing (not shown) forming an outer appearance and having therein a space for accommodating the components constituting the main body 10, a rotation mop 80 rotatably provided, a roller for assisting movement and cleaning of the main body, and a charging terminal to which charging power is supplied from the charging stand. The cleaning cloth 90 is attached to the rotation mop 80 to clean the floor surface through the rotation operation of the rotation mop 80.

The main body travels by the rotation operation of the rotation mop 80. The main body may move forward or backward, or rotate according to the rotation direction of the rotation mop, and may travel in a diagonal direction.

In addition, the mobile robot 12 may further include a water tank (not shown) disposed inside the main body to store water, a pump (not shown) for supplying water stored in the water tank to the rotation mop 80, and a connection hose (not shown) forming a connection flow path connecting the pump and the rotation mop. In some cases, a valve for controlling water supply may be further provided.

The mobile robot 1, 11, and 12 may be provided with a control panel, which includes an operation unit (not shown) that receives various commands for controlling the mobile robot 1 from a user, on an upper surface of the casing.

The mobile robot 1, 11, and 12 includes a main body that performs a designated operation, an obstacle detection unit (not shown) disposed on a front surface of the main body to sense an obstacle, and image acquisition units 170a and 170b for capturing an image. The image acquisition units 170a and 170b and the obstacle detection unit (not shown) are also disposed on the front surface or an upper surface of the main body.

The obstacle detection unit detects an obstacle located in the traveling direction or around the main body 10.

The image acquisition units 170a and 170b capture an image of an indoor area. Based on the image captured through the image acquisition unit, it is possible to detect obstacles around the main body and monitor the indoor area as well. The image acquisition unit may be disposed to face a forward and upward direction at a predetermined angle to photograph the forward and upward sides of the mobile robot.

The image acquisition units 170a and 170b may include a plurality of cameras for photographing the forward and upward sides, respectively. The image acquisition unit may have cameras disposed on the front surface of the main body and the upper portion of the main body, respectively. In addition, the image acquisition unit may be provided with a separate camera for photographing a floor surface.

The mobile robot 1 may further include a position acquisition unit (not shown) for obtaining current position information. The mobile robot 1 may include a GPS (global positioning system) and a UWB (ultra-wideband) and determine the current position. In addition, the mobile robot 1 may determine the current position using an image.

The main body 10 is provided with a rechargeable battery (not shown), and the charging terminal of the battery is connected to a commercial power source (e.g., a power outlet in a home), or the main body is docked to the charging stand connected to a commercial power source and the charging terminal may be electrically connected to the commercial power source through the contact with the terminal of the charging stand. In this way, the battery may be charged by charging power supplied to the main body.

Electrical components constituting the mobile robot 1 may receive power from the battery, and thus, the mobile robot 1 can travel by itself with the battery charged in a state that it is electrically separated from the commercial power source.

Hereinafter, the mobile robot 1 is described using the dry cleaning type mobile robot and the wet cleaning type mobile robot as examples, but any robot may be applied as long as it autonomously travels in an area and senses sound without being limited thereto.

Figure 2A:
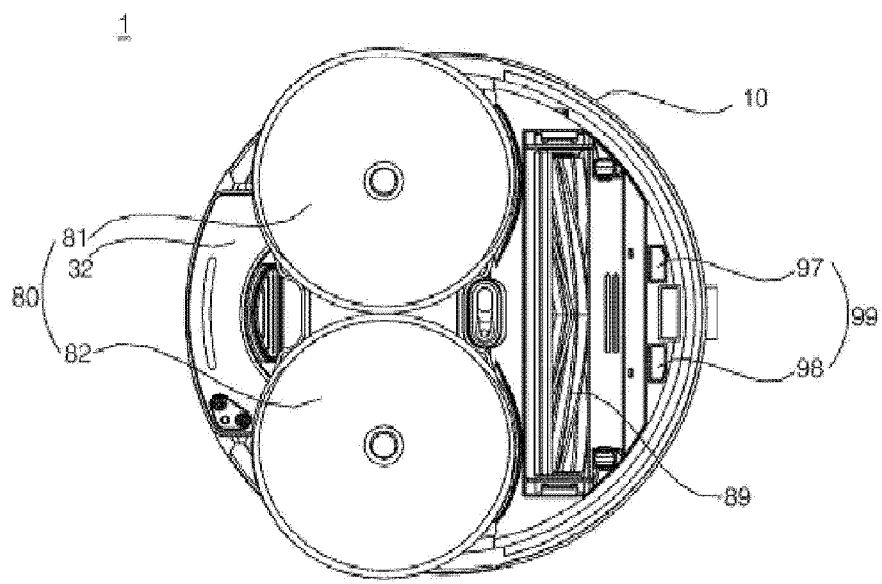
FIGS. 2A and 2B are views showing a bottom surface of the mobile robot shown in FIG. 1B.
Figure 2B:
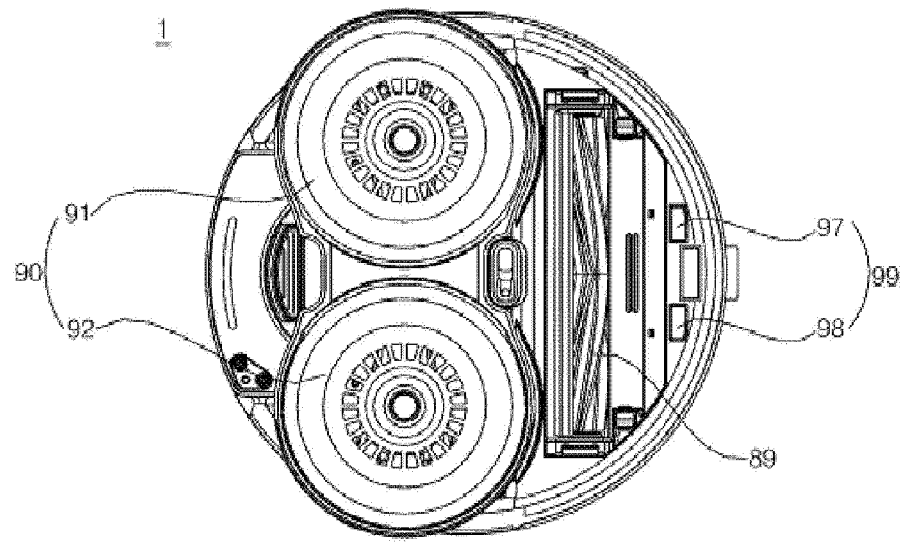

FIGS. 2A and 2B are views showing a bottom surface of the mobile robot shown in FIG. 1B.

As shown in FIG. 2A, the rotation mop 80 of the mobile robot 12 is disposed at the casing to face the floor so that the cleaning cloth 90 is attached to and detached from the rotation mop 80. The rotation map is disposed symmetrically left and right at the lower side of the main body 10. The rotation mop 80 is disposed in front of a water tank 32.

The main body 10 forms an outer appearance and includes a casing (not shown) that forms a space therein for accommodating the components constituting the main body 10, a rotational map 80 that is rotatably provided, a roller 89 for assisting in movement and cleaning of the main body 10, and a charging terminal 99 to which charging power is supplied from the charging stand.

The charging terminal 99 is electrically connected to a terminal for charging provided in the charging station when the mobile robot is docked to the charging station, and receives a charging current from the charging station. The battery is charged by the supplied charging current.

The rotation mop 80 moves by using a frictional force with the floor surface generated by the clockwise or counterclockwise rotation when viewed from above, and wipes the floor with the cleaning cloth to clean it. The rotation mop 80 is provided to rotate about a rotation axis that is substantially extended in an up-down direction.

The rotation mop 80 includes a first rotating plate 81 and a second rotating plate 82 so that the main body 10 is moved along the bottom in the area through rotation.

The main body 10 travels forward, backward, left, and right as the first rotating plate 81 and the second rotating plate 82 of the rotation mop 80 rotate about the rotation axis. In addition, as the first rotating plate and the second rotating plate rotate, the main body 10 removes foreign substances from the floor surface through the attached cleaning cloth to perform wet cleaning.

The main body 10 may include a driving unit (not shown) for driving the first rotating plate 81 and the second rotating plate 82. The driving unit may include at least one motor.

The rotation mop 80 may be disposed so that the lower surfaces are inclined, respectively.

The lower surface of the first rotating plate 81 is inclined to form a downward slope in the left direction as a whole. The lower surface of the second rotating plate 82 is inclined to form a downward slope in the right direction as a whole. The lower surface of the first rotating plate 81 has the lowest point formed at the left side. The lower surface of the first rotating plate 81 has the highest point formed at the right side. The lower surface of the second rotary plate 82 has the lowest point formed at the right side. The lower surface of the second rotary plate 82 has the highest point formed at the left side. For example, as the first rotating plate 81 rotates in a first direction at a first rotational speed, and the second rotating plate 82 rotates in a second direction at the first rotational speed, the main body 10 can move forward and backward. In addition, the main body 10 can move left and right by setting the rotational speeds of the first and second rotational plates to be different, or by setting the rotational directions of the first and second rotational plates to be the same.

In addition, the main body 10 may further include a tilting frame (not shown). The tilting frame is disposed to be inclined within a predetermined angle range with respect to the rotation mop 80. The tilting frame allows an inclined angle to be changed depending on the condition of the floor. The tilting frame may perform a function of suspension (which supports weight and reduces vertical vibrations) for the rotation mop 80.

The roller 89 rotates, collects foreign substances on the floor surface and accommodates them in a dust container (not shown) while traveling.

As shown in FIG. 2B, the first rotary plate 81 and the second rotary plate 82 may be attached to the cleaning cloths 91, 92 (90).

The rotation mop 80 is configured such that the cleaning cloth is detachably attached thereto. The rotation mop 80 may be provided with mounting members for attachment of the cleaning cloths to the first rotating plate 81 and the second rotating plate 82, respectively. For example, the rotation mop 80 may be provided with Velcro, a fitting member, or the like as the mounting member so that the cleaning cloth is attached and fixed thereto. In addition, the rotation mop 80 may further include a cleaning cloth tool (not shown) as a separate auxiliary means for fixing the cleaning cloth to the first rotating plate 81 and the second rotating plate 82.

The cleaning cloth 90 absorbs water and removes foreign substances through friction with the floor surface. The cleaning cloth 90 may include a pad in the form of microfiber or fabric, and a material such as cotton fabric or cotton blend may be used. As long as the cleaning cloth contains moisture in a certain ratio or more and has a predetermined density, any material may be used, and it is specified that the material is not limited.

The cleaning cloth 90 receives water from the water tank 32 through the connection passage. Water may be supplied from the water tank 32 to the cleaning cloth 90 through the connection passage by the operation of the pump.

The cleaning cloth 90 is formed in a circular shape.

The shape of the cleaning cloth 90 is not limited to that shown in the drawings and may be formed in a rectangular shape or a polygonal shape, but may be preferably configured in a shape that does not interfere with the rotation operations of the first and second rotating plates in consideration of the rotation operations of the first and second rotating plates. In addition, the shape of the cleaning cloth may be changed to a circular shape by the cleaning cloth tool provided separately.

The rotation mop 80 is configured such that when the cleaning cloth 90 is mounted thereto, the cleaning cloth contacts the floor surface. The rotation mop 80 is configured such that in consideration of a thickness of the cleaning cloth, the separation distance between the casing and each of the first rotating plate and the second rotating plate changes in accordance with the thickness of the cleaning cloth.

The rotation mop 80 further includes members for adjusting the separation distance between the casing and each of the rotating plates so that the cleaning cloth contacts with the floor surface, and pressing the first and second rotating plates against the floor surface.

Figure 3:
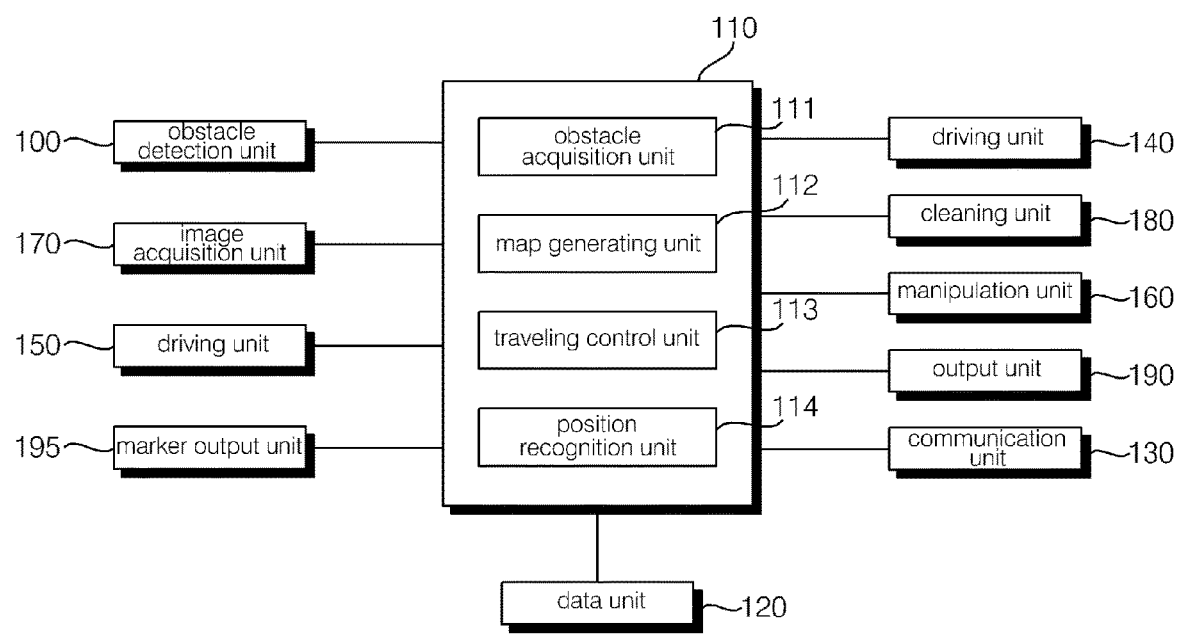
FIG. 3 is a block diagram schematically illustrating the configuration of the mobile robot according to one embodiment of the present disclosure.

FIG. 3 is a block diagram schematically illustrating the configuration of the mobile robot according to one embodiment of the present disclosure.

As shown in FIG. 3, the mobile robot 1 includes a cleaning unit 180, a data unit 120, an obstacle detection unit 100, an image acquisition unit 170, a sensor unit 150, a communication unit 130, a manipulation unit 160, an output unit 190, a driving unit 140, and a control unit 110 for controlling overall operations.

In addition, the mobile robot 1 may further include a marker output unit 195 that irradiates a marker upward from the main body.

Such a configuration of the mobile robot may be applied to both the dry cleaning type mobile robot and the wet cleaning type mobile robot, and may be applied to any other mobile robot, including a lawn robot, that autonomously drives in an area.

The manipulation unit 160 includes at least one input means such as a button, a switch, and a touch pad to receive a user command. The operation unit may be provided at an upper portion of the main body 10 as described above.

The output unit 190 includes a display such as an LED and an LCD, and displays operation mode, reservation information, battery state, operation state, error state, and the like of the mobile robot 1. In addition, the output unit 190 includes a speaker or a buzzer to output predetermined sound effect, warning sound, or voice guidance corresponding to the operation mode, the reservation information, the battery state, the operation state, and the error state.

In some cases, the mobile robot 1 may further include an audio input unit (not shown). The audio input unit includes at least one microphone, and receives a sound generated within a predetermined distance from the main body 10 or in an area. The audio input unit may further include a signal processing unit (not shown) that filters, amplifies, and converts the received sound. The mobile robot 1 may operate by recognizing a voice command input through the audio input unit.

The data unit 120 stores an acquired image input from the image acquisition unit 170, reference data based on which an obstacle recognition unit 111 determines an obstacle, and obstacle information on the detected obstacle and map data for the area.

The communication unit 130 communicates with a terminal 300 in a wireless communication method. In addition, the communication unit 130 may be connected to an Internet network through an in-home network to communicate with an external server (not shown) or the terminal 300 for controlling the mobile robot.

The communication unit 130 transmits the generated map to the terminal 300, receives a cleaning command from the terminal, and transmits data on the operation state of the mobile robot and the cleaning state to the terminal. In addition, the communication unit 130 may transmit information on an obstacle detected during traveling to the terminal 300 or the server. The communication unit 130 includes short-range wireless communication such as Zig-Bee and Bluetooth, and communication modules such as Wi-Fi and WiBro to transmit and receive data.

Further, the communication unit 130 transmits and receives UWB signals to and from other mobile robots.

The mobile robot 1 may determine location using GPS and UWB signals. Furthermore, the mobile robot 1 may determine location using an image acquired through the image acquisition unit 170.

The communication unit 130 may communicate with the charging station and receive a signal to return the charging station or a guide signal for docking on the charging station. The mobile robot 1 searches for the charging station and docks on the charging station based on a signal received through the communication unit 130. In addition, the communication unit 130 may transmit a signal generated by the control unit to the charging station.

Meanwhile, the mobile robot 1 may be connected to a terminal (not shown). The terminal may receive data of the mobile robot 1, monitor the operation state of the mobile robot, and control the mobile robot 1 through a control command. The terminal 300 may be directly one-to-one connected to the mobile robot 1, and may also be connected to the server, for example, a home appliance management server.

The terminal may output a predetermined warning sound or display the received image according to data received from the mobile robot 1.

The terminal is a device in which a communication module is mounted to enable network access, a program for controlling the mobile robot, or an application for controlling the mobile robot is installed, and a device such as a computer, a laptop, a smart phone, a PDA, and a tablet PC may be used as the terminal. In addition, a wearable device such as a smart watch may also be used as the terminal.

In the case of the wet cleaning type mobile robot 12, the driving unit 140 transmits a driving force so that the rotating mop 80 rotates. The main body 10 moves as the first and second rotating plates 81 and 82 of the cleaning unit 180 rotate by the driving force of the driving unit 140.

In the case of the wet cleaning type mobile robot 12, the cleaning unit 180 rotates the first rotating plate 81 and the second rotating plate 82 of the rotation mop 80 by a driving force of the driving unit 140 to remove foreign substances from the floor surface through a rotating operation of the attached cleaning cloth 90. In the wet cleaning type mobile robot 12, the cleaning unit and the driving unit may be formed as one unit.

In addition, the cleaning unit 180 may further include a water supply unit (not shown) connected to the rotation mop 80 to supply water to the cleaning cloth attached to each of the first and second rotating plates, and the water tank 32. The water supply unit may include a pump or a valve.

The cleaning unit 180 may include a separate cleaning cloth tool for mounting the cleaning cloth to the rotation mop.

In the case of the dry cleaning type mobile robot 11, the driving unit 140 controls the left wheel and the right wheel to move the main body. In the case of the dry cleaning type mobile robot 11, the cleaning unit 180 includes the suction unit 185 to suck foreign substances.

The battery (not shown) supplies power required not only for the motor but also for the overall operation of the mobile robot 1. When the battery is dead, the mobile robot 1 may drive back to the charging station for charging, and while the traveling to return, the mobile robot 1 may detect the position of the charging station by itself.

The charging station (not shown) may include a signal transmitter (not shown) for transmitting a return signal. The return signal may be an ultrasonic signal or an infrared signal, but is not limited thereto.

The obstacle detection unit 100 irradiates a pattern of a predetermined form and acquires the irradiated pattern as an image. The obstacle detection unit may include at least one pattern irradiation unit (not shown) and a pattern acquisition unit (not shown). The pattern irradiation unit may irradiate the pattern to the traveling direction and the pattern acquisition unit may acquire an image including the irradiated pattern.

In addition, the obstacle detection unit 100 may include a sensor such as an ultrasonic sensor, a laser sensor, an infrared sensor, or a 3D sensor, and may detect a position and a distance of an obstacle located in the traveling direction. Further, the obstacle detection unit 100 may detect an obstacle through an image for the traveling direction. In some cases, the sensor unit and the image acquisition unit may be included in the obstacle detection unit.

The sensor unit 150 includes a plurality of sensors to detect an obstacle. The sensor unit 150 detects an obstacle in the forward direction, i.e., the traveling direction, by using at least one of an ultrasonic sensor, a laser sensor, and an infrared sensor. The sensor unit 150 may be used as an auxiliary means for detecting an obstacle that is not detected by the obstacle detection unit.

In addition, the sensor unit 150 may further include a cliff detection sensor for sensing whether a cliff exists on the floor in a traveling region. When a transmitted signal is reflected and received, the sensor unit 150 inputs information on whether an obstacle exists or a distance to the obstacle as an obstacle detection signal to the control unit 110.

The sensor unit 150 includes at least one inclination sensor to detect an inclination of the main body. The inclination sensor calculates an inclined direction and an inclined angle when the main body is inclined in front, rear, left, and right directions. A tilt sensor, an acceleration sensor, and the like may be used as the inclination sensor, and for the acceleration sensor, any of a gyro type, an inertial type, and a silicon semiconductor type may be applied.

The sensor unit 150 may detect a rotation angle and a moving distance of the main body 10. The angle may be measured through a gyro sensor and the moving distance may be measured through a laser OFS (Optical Fiber Sensor).

In addition, the sensor unit 150 may detect an operation state or abnormality through a sensor installed inside the mobile robot 1.

The image acquisition unit 170 includes at least one camera.

The image acquisition unit 170 may include a camera that converts an image of a subject into an electrical signal and then converts it into a digital signal and stores the digital signal in a memory device. The camera includes at least one optical lens and an image sensor (e.g., CMOS image sensor) including a plurality of photodiodes (e.g., pixels) that are imaged by light passing through the optical lens and a digital signal processor (DSP) that configures an image based on the signals output from the photodiodes. The digital signal processor may generate not only a still image but also a video image including frames composed of still images.

The image sensor is a device that converts an optical image into an electrical signal, and includes a chip having a plurality of integrated photo diodes, and an example of the photodiode is pixel. Charges are accumulated in each pixel through images formed on the chip by light passing through the lens, and the charges accumulated in the pixel are converted into electrical signals (e.g., voltage). A charge coupled device (CCD) and a complementary metal oxide semiconductor (CMOS) are well known as the image sensor.

When the mobile robot operates, the image acquisition unit 170 continuously captures images. In addition, the image acquisition unit 170 may capture images at a given period or in units of distance. The image acquisition unit 170 may set a photographing period depending on a moving speed of the mobile robot.

The image acquisition unit 170 may not only acquire an image of the front side in the traveling direction, but also capture an image of an upward ceiling shape. The image acquisition unit 170 stores images captured while the main body is traveling in the data unit 120 as image data.

The image acquisition unit 170 may acquire a forward upward image using one camera, and when a camera is installed at each of the front surface and the upper portion of the main body, may acquire a forward image and an upward image separately.

The obstacle detection unit 100 inputs information on the position or movement of the detected obstacle to the control unit 110. The sensor unit 150 may input a detection signal for an obstacle sensed by a provided sensor to the control unit. The image acquisition unit 170 inputs the captured image to the control unit.

The marker output unit 195 is provided on one side of the upper portion of the main body and irradiates a marker of a specified shape upward from the main body. The marker output unit 195 irradiates a marker in a direction perpendicular to the upper portion of the main body. The marker output unit 195 may include a marker and a light source. The light source is preferable to be a laser but the light source may be any one without being limited thereto.

The marker irradiated from the mobile robot is displayed on the ceiling. The marker is formed of a combination of at least one of a point, a line, and a plane, and is preferably configured in a form capable of distinguishing forward, backward, left, and right directions. In addition, it is preferable that the marker is formed to indicate the moving direction of the main body. The mobile robot may output the same type of marker, but in order to identify a plurality of mobile robots, each mobile robot may include a unique marker of a different type.

The control unit 110 controls the mobile robot to travel within a designated area in the traveling area.

The control unit 110 processes the data input by the manipulation of the manipulation unit 160 to set the operation mode of the mobile robot, outputs the operation state through the output unit 190, and allows warning sounds, sound effects, and voice guidance depending on the operation state, error state, or obstacle detection to be output through the speaker of the output unit.

The control unit 110 generates a map of the driving area based on the image obtained from the image acquisition unit 170 and the obstacle information detected from the sensor unit 150 or the obstacle detection unit 100. The control unit 110 may generate a map based on obstacle information while traveling within the area, and may generate the map by determining the shape of the driving area based on the image from the image acquisition unit.

The control unit 110 recognizes an obstacle detected by the image acquisition unit 170 or the obstacle detection unit 100, and controls the mobile robot to perform a specific operation or change a path to move in response thereto.

In addition, the control unit may output a sound effect or warning sound through the output unit as necessary, and may control the image acquisition unit to capture an image.

The control unit 110 sets a moving path based on a specific destination, and controls the mobile robot to avoid obstacles while traveling along the moving path.

In addition, the control unit 110 controls the cleaning unit 180 to operate according to the cleaning command and controls the mobile robot to move while cleaning the floor surface. The control unit 110 controls the mobile robot to moves through driving of the left and right wheels while removing foreign substances from the floor surface using the cleaning cloth in the case of the wet cleaning type mobile robot, and while sucking the foreign substances through the suction unit in the case of the dry cleaning type mobile robot.

The control unit 110 determines the traveling state by comparing the set moving path with the travel route along which the main body 10 has actually moved. When the main body 10 moves, the control unit 110 determines the traveling state according to whether the main body 10 moves along a designated travel route or whether it travels normally.

The control unit 110 determines the traveling state by determining whether the main body 10 travels along a moving path set based on a change in the position while moving. The control unit 110 may determine that there is an abnormality in the traveling state when the main body is traveling apart from the set moving path by a preset distance or more.

In the case of the wet cleaning type mobile robot, when there is an abnormality in the traveling state, the control unit 110 may determine a cause of the abnormality such as an abnormality in the driving unit provided in the cleaning unit, an abnormality in the floor state, or no mounting of cleaning cloth.

The control unit 110 may determine a material of the floor surface based on a current value of the motor. When abnormal traveling occurs continuously, it is determined that it is due to the floor material, and the traveling may be changed according to the material of the floor surface.

If there is an abnormality in the traveling state, the control unit 110 generates a warning message, a warning sound, and the like as a notification corresponding thereto, and outputs it through the output unit 190.

The control unit 110 may display a warning in combination of at least one of a message, an icon, and an image on a control panel provided on the upper portion of the main body 10, may turn on a warning lamp, and may also output a voice guidance.

When the mobile robot is traveling normally, the control unit 110 controls the mobile robot to clean the floor surface while traveling in a designated area according to an input cleaning command.

When there is an abnormality in the traveling state, the control unit 110 sets the mobile robot to perform re-cleaning according to the cause of the abnormality. The control unit 110 outputs a notification for re-cleaning through the output unit.

In addition, when there is an abnormality in the traveling state, the control unit 110 may stop the operation of the mobile robot. In the case of the wet cleaning type mobile robot, when it is determined that the cleaning cloth is not mounted or that the motor or the driving unit is abnormal, the control unit 110 stops the operation. In the case of the dry cleaning type mobile robot, the control unit 110 may control the operation of the mobile robot in response to a blockage of an intake port or the like.

In addition, the control unit 110 generates a warning according to the occurrence of the abnormality through the communication unit 130 and transmits the generated warning to the terminal 300.

When it is determined that there is an abnormality in the traveling state, the control unit 110 stores the location where the abnormality occurs and displays the corresponding location on the map. The control unit 110 transmits data on the location where the abnormal traveling occurs to the terminal 300 so that the location is displayed on the map through the terminal.

The terminal 300 displays the location where the abnormal traveling occurs on the map according to the data received from the control unit 110. In addition, the terminal 300 may display a message for the replacement of the cleaning cloth based on the received data.

When the operation of the mobile robot is stopped, in case that a cleaning command is input from the manipulation unit or the terminal 300 again, the control unit 110 may retry traveling and re-determine the traveling state.

The control unit 110 may recognize a voice by analyzing a sound input through the audio input unit (not shown). In some cases, the control unit 110 may recognize the input voice by transmitting the input sound to a voice recognition server (not shown). When voice recognition is completed, the control unit 110 performs an operation corresponding to the voice command.

In addition, the control unit 110 outputs a voice guidance corresponding to the voice command through the speaker (not shown) of the output unit 190.

The control unit 110 checks a charging capacity of the battery and determines a return time to the charging station.

When the charging capacity reaches a predetermined value, the control unit 110 stops the operation being performed and starts searching for the charging station for return to the charging station. The control unit 110 may output a notification of the charging capacity of the battery and a notification of the return to the charging station. In addition, when a signal transmitted from the charging station is received through the communication unit 130, the control unit 110 may return to the charging station.

In addition, when the mobile robot is returned to the charging station, the control unit 110 may communicate with the charging station through the communication unit. The control unit 110 may generate a signal for returning to the charging station or a single for searching for the charging station and transmit the signal to the charging station through the communication unit. The control unit 110 may generate a signal for the charging state and transmit the signal to the charging station through the communication unit.

The control unit 110 may determine the type of obstacle sensed through the obstacle recognition unit while traveling to distinguish the charging station from other obstacles.

The control unit 110 includes an obstacle recognition unit 111, a map generation unit 112, a traveling control unit 113, and a position recognition unit 114.

The map generation unit 112 generates a map of an area based on obstacle information while traveling in the area during an initial operation or in case that a map of the area is not stored. In addition, the map generation unit 112 updates a previously generated map based on obstacle information acquired during traveling. In addition, the map generation unit 112 analyzes an image acquired during traveling and determines the shape of the area to generate a map.

After generating a basic map, the map generation unit 112 divides a cleaning area into a plurality of regions, and generates a map including connection paths connecting the plurality of regions and information on obstacles in each region.

The map generation unit 112 processes the shape of the region for each divided region. The map generation unit 112 may set an attribute for each of the divided regions.

In addition, the map generation unit 112 may distinguish regions based on features extracted from the image. The map generation unit 112 may determine a position of a door based on the connection relationship of the features, and accordingly, may divide the boundary between the regions to generate a map composed of a plurality of regions.

The obstacle recognition unit 111 determines an obstacle through data input from the image acquisition unit 170 or the obstacle detection unit 100, and the map generation unit 112 generates a map of a traveling area and incorporates information on the detected obstacle into the map.

The obstacle recognition unit 111 determines an obstacle by analyzing data input from the obstacle detection unit 100. The orientation of the obstacle or the distance to the obstacle is calculated according to a detection signal of the obstacle detection unit, for example, an ultrasonic wave signal or a laser signal. In addition, the obstacle recognition unit may analyze an acquired image including a pattern to extract the pattern and analyze the shape of the pattern to determine the obstacle.

When using an ultrasonic wave signal or an infrared signal, the obstacle recognition unit 111 determines the obstacle based on the difference in the shape of the received ultrasonic wave signal and the ultrasonic wave signal reception time depending on the distance to the obstacle or the position of the obstacle.

The obstacle recognition unit 111 may analyze an image captured through the image acquisition unit 170 to determine an obstacle located around the main body.

The obstacle recognition unit 111 may detect a charging station. The obstacle recognition unit 111 may distinguish the charging station from other obstacles based on its shape through an image.

The obstacle recognition unit 111 may detect a human body. The obstacle recognition unit 111 analyzes data input through the obstacle detection unit 100 or the image acquisition unit 170 to detect a human body based on a silhouette, a size, a face shape, and the like, and determines whether the human body is a registered user.

By analyzing the image data, the obstacle recognition unit 111 extracts features of an obstacle, determines the obstacle based on the shape (form), size, and color of the obstacle, and determines the position thereof.

The obstacle recognition unit 111 may determine the type of the obstacle by extracting the features of the obstacle based on the pre-stored obstacle data, after excluding the background of the image from the image data. The obstacle data is updated by new obstacle data received from the server. The mobile robot 1 may store obstacle data on the detected obstacle and receive data on the type of obstacle from the server with respect to the other data.

Further, the obstacle recognition unit 111 stores information on the recognized obstacle in the obstacle data and transmits the recognizable image data to the server (not shown) through the communication unit 130 to determine the type of the obstacle. The communication unit 130 transmits at least one image data to the server.

The obstacle recognition unit 111 determines an obstacle based on the image data converted by the image processing unit.

The position recognition unit 114 calculates a current position of the main body.

In addition, the position recognition unit 114 calculates a position of another mobile robot located within the same area.

The position recognition unit 114 may determine a current position of the main body and a position of another mobile robot based on a signal received through a position recognition device, e.g., a GPS, an ultra wide band (UWB), or the like, provided thereto. The position recognition unit 114 may calculate the position of another mobile robot based on the position signal received through the communication unit.

Further, the position recognition unit 114 may determine the position of another mobile robot based on the marker included in the image data. Since the mobile robot irradiates the marker upward vertically from the main body, the position of the mobile robot outputting the marker may be determined through the position of the marker on the ceiling. When a plurality of markers are recognized in the image data, the position recognition unit 114 may calculate the positions of the respective mobile robots.

In addition, the position recognition unit 114 may determine the distance and direction between the mobile robot and the main body through a marker as image data. The position recognition unit 114 may determine the traveling direction of the corresponding mobile robot according to the shape of the marker.

The position recognition unit 114 may store data on a plurality of markers and distinguish the respective mobile robots through the shapes of the markers.

In addition, the position recognition unit 114 may extract features from the image of the image acquisition unit 170, that is, the image data, and compare the features to determine the current position. The position recognition unit 114 may determine the current position from the image using the structure around the main body, the shape of the ceiling, and the like in the image. The position recognition unit 114 detects features such as dots, lines, and surfaces with respect to pixels constituting an image, and analyzes features of the area based on the detected features to determine a position. The position recognition unit 114 may extract an outline of the ceiling and extract features such as lighting and the like.

The position recognition unit continuously determines the current position in the area through image data, learns by matching features and reflecting changes in the surrounding structures, and calculates the position.

When determining a position through a position signal or an image, the position recognition unit 114 may collect position information by setting any one point in the area as a reference position. For example, the position recognition unit may set any one of an initial start point and a position of a charging stand as a reference position. The position recognition unit 114 may set a reference position in the area, generate and store coordinates and a map for the area based on the corresponding reference position. When the map is generated, the mobile robot may move based on the stored map.

The traveling control unit 113 travels in the area based on the map, and controls the mobile robot to pass through an obstacle or avoid the obstacle by changing the moving direction or the travel route in response to the sensed obstacle information.

The traveling control unit 113 controls the cleaning unit 180 in accordance with the cleaning command so that the main body 10 performs cleaning by removing foreign substances from the floor surface while traveling in the cleaning area.

The traveling control unit 113 controls the cleaning unit 180 to independently control the operations of the first rotating plate 81 and the second rotating plate 82, so that the main body 10 travels in a straight line or in a rotating manner.

The traveling control unit 113 controls the main body to move to a set region or to move within the set region based on the map generated by the map generation unit 112. In addition, the traveling control unit 113 controls the traveling based on the current position calculated by the position recognition unit 114.

When the position recognition unit 114 calculates not only the current position but also the position of another mobile robot, the traveling control unit 113 controls the driving unit by setting a travel route to follow the another mobile robot.

The traveling control unit 113 sets the position of a specific mobile robot among other mobile robots whose positions are calculated as a target point and controls the mobile robot to follow the corresponding mobile robot.

The traveling control unit 113 controls the mobile robot to perform a predetermined operation in response to an obstacle or change the travel route according to a detection signal of the obstacle detection unit 100.

The traveling control unit 113 controls the mobile robot to perform at least one of avoidance, approach, setting an approach distance, and stopping, decelerating, accelerating, reversing, making a U-turn, and changing the traveling direction in response to the detected obstacle.

The traveling control unit 113 determines the driving state based on the information on the position change applied from the position recognition unit, and in case of abnormal traveling, generates an error corresponding to the abnormal traveling.

When there is an abnormality in the driving state, the traveling control unit 113 may determine the cause of the abnormality and maintain the operation, stop the operation, or perform compensation driving in response to the cause of the abnormality. For example, when an abnormality occurs in the driving state because no cleaning cloth is attached, the operation may be stopped and a notification of the absence of cleaning cloth may be output. Further, when a position change of a preset magnitude or more occurs due to a material of the floor or foreign substances on the floor, for example, when slipping occurs, information on the position is stored, and compensation traveling for slipping is performed.

When abnormal driving occurs, the traveling control unit 113 may determine whether or not traveling is possible, and when traveling is possible, the traveling control unit 113 controls the mobile robot to return to the moving path and travel, and to stop the operation when traveling is impossible.

In addition, the traveling control unit 113 may output an error, and may output a preset warning sound or voice guidance as necessary.

When the cooperative mode is set, the mobile robot 1 may check the position of another mobile robot in the area and perform a designated operation while moving to follow the another mobile robot. In addition, when another mobile robot in the area is detected, the mobile robot 1 may set a cooperative mode.

When there is a plurality of mobile robots in the area, the first mobile robot 11 may travel according to a setting, and the second mobile robot 12 may move to follow the first mobile robot.

For example, when the dry cleaning type mobile robot sucks foreign substances while traveling in the area, the wet cleaning type mobile robot may follow the dry cleaning type mobile robot to perform mop cleaning. The dry cleaning type mobile robot may be set as the first mobile robot 11, and the wet cleaning type mobile robot may be set as the second mobile robot 12.

In addition, when a third mobile robot exists in the area, avoidance may be set not to collide with the third mobile robot based on the position of the third mobile robot, and in some cases, the area may be divided into regions and set the mobile robots to clean the respective regions. If necessary, the second mobile robot may travel in the area to follow the first mobile robot and then follow the third mobile robot based on the position of the third mobile robot.

The first mobile robot 11 transmits a position signal or outputs a marker while driving to provide information on the position thereof to the second mobile robot 12. The second mobile robot 12 may receive the position signal of the first mobile robot or calculate a position of the first mobile robot based on the position of the marker by photographing the marker to follow the first mobile robot.

The second mobile robot 12 calculates the position of the first mobile robot 11 to travel while setting the position of the first mobile robot 11 as a target point, and to travel by changing the target point as the position of the first mobile robot changes. The second mobile robot may follow the first mobile robot while maintaining a predetermined distance therebetween.

While following the first mobile robot 11, the second mobile robot 12 may collect obstacle information and determine whether it is a travelable path, and the second mobile robot 12 may avoid the obstacle by traveling along a path different from the moving trajectory of the first mobile robot. The mobile robot may store the collected information on obstacles and may travel by reflecting the information when setting the driving area.

Accordingly, a difference may occur between the movement trajectory of the first mobile robot and the movement trajectory of the second mobile robot that follows the first mobile robot.

The second mobile robot may follow the position of the first mobile robot as a target, but may move by planning the moving position and the moving distance in consideration of cleaning patterns, obstacles, and the like.

The 'following' or 'active following' mentioned below is defined as being caused by active movement of the mobile robot 1.

Figure 4:
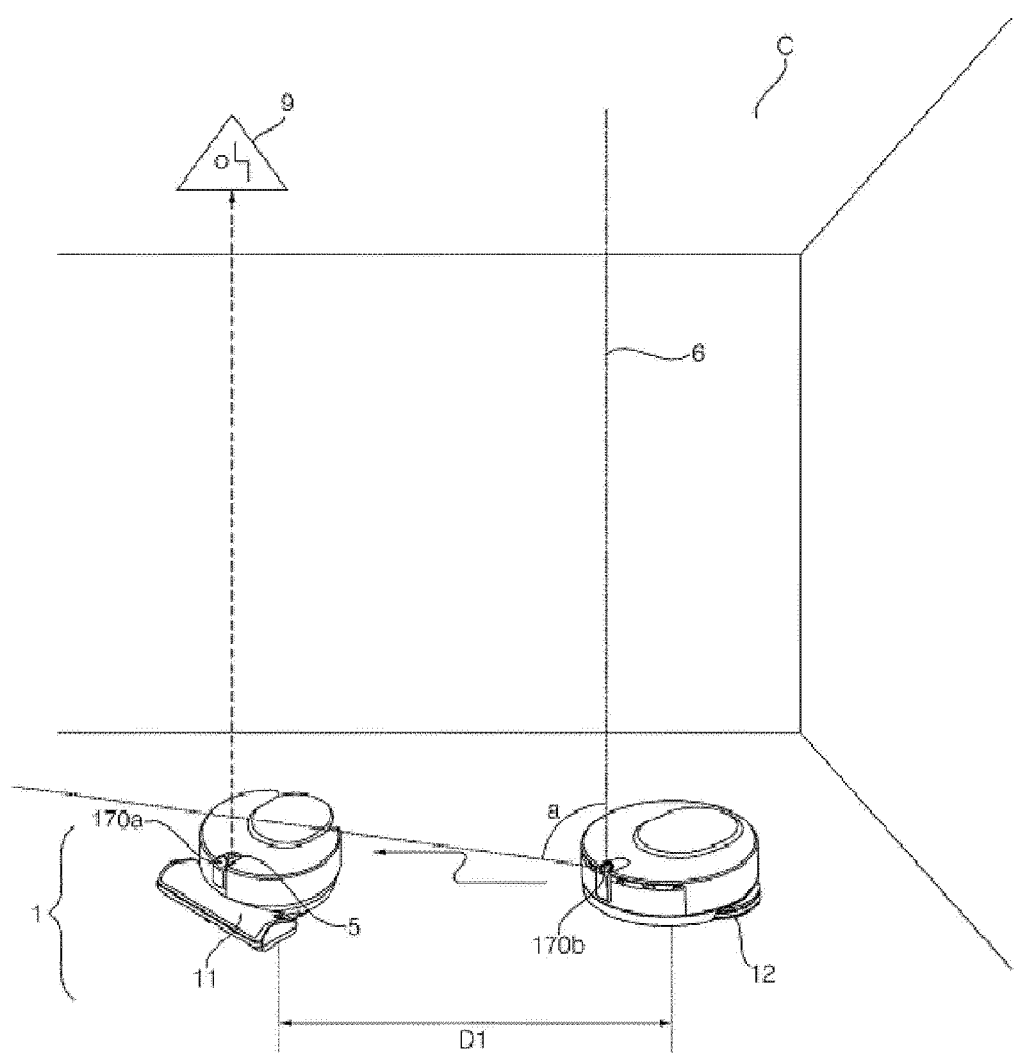
FIG. 4 is a reference diagram for explaining the operation of a plurality of mobile robots according to one embodiment of the present disclosure.

FIG. 4 is a reference diagram for explaining the operation of a plurality of mobile robots according to one embodiment of the present disclosure.

As shown in FIG. 4, a plurality of mobile robots 11 and 12 may operate in an area.

For example, the first mobile robot 11 may be a mobile robot of dry cleaning type that sucks foreign substances, and the second mobile robot 12 may be a mobile robot of wet cleaning type that performs wet mop cleaning. A plurality of dry cleaning type mobile robots or a plurality of wet cleaning type mobile robots may be provided, and the mobile robot is not limited to the dry or wet cleaning type, and may be set as any mobile robot that autonomously travels in an area.

The mobile robot 1 cleans the area based on not only its own position but also the positions of other mobile robots. The first mobile robot 11 may clean while traveling in an area according to a setting, and the second mobile robot 12 may perform cleaning while moving to follow the first mobile robot 11. This is an example, and the first mobile robot may move to follow the second mobile robot.

The first mobile robot 11 outputs a marker toward the upward side of the main body, that is, a ceiling, while traveling according to the setting. The marker output unit 195 provided on the upper portion of the main body outputs a marker 9 having a certain shape, and the marker 9 is displayed on the ceiling C.

The second mobile robot 12 acquires an image of the front upward side or the upward side with reference to the front surface of the main body through the image acquisition unit 170. The second mobile robot 12 analyzes the image acquired by the image acquisition unit to extract the marker 9, and calculates the position of the first mobile robot 11 based on the position of the marker on the ceiling. Further, the second mobile robot 12 calculates the position of the main body based on the position of the marker or the shape of the marker in the acquired image. The position recognition unit 114 may calculate coordinates of the first and second mobile robots in the area.

The second mobile robot 12 moves by setting the position of the first mobile robot as a target point, acquires an image continuously or at a predetermined period, and changes the target point according to the position change of the marker to travel following the first mobile robot.

The second mobile robot 12 may also output a marker. The second mobile robot may calculate a position by comparing the marker of the first mobile robot with its own marker from the acquired image. In some cases, the second mobile robot may not output a marker when it follows another mobile robot, i.e., the first mobile robot.

The marker 9 may be formed in various identification patterns, and hereinafter, factors such as a dot, a line, and a plane constituting the pattern are defined as marker components.

The marker need to have a distinctiveness that contrasts clearly with the background, and this distinction is better if it is not affected by ambient lighting. The marker may have features such as a dot, a line, a contour, an area, or a combination thereof as marker components. Hereinafter, for convenience of description, it is assumed that the marker components are dots (circles).

The marker may be composed of a plurality of dots, and may be composed of a plurality of lines, and a specific type of figure or picture may be used as the marker.

In consideration of the distinctiveness with the background, it is preferable that the marker M is brighter than the background, and in this aspect, the marker M may be projected with a brightness or color that is distinguished from the surrounding light.

The marker output unit 195 has a light source that electrically emits lights so that a specific type of marker may be projected onto a ceiling or a wall surface, and the light source may include a light emitting diode (LED), an infrared radiation, or a laser.

In the case of the laser, a marker of a specific pattern is projected on the ceiling to distinguish the front side and the back side, and accordingly, the center or the traveling direction of the target to follow (e.g., the first mobile robot) may be detected. The laser may project the marker regardless of the height of the ceiling. In the case of the laser, a laser beam may be projected to cover the entire wall of 360 degrees.

In the IR (infrared radiation), a marker of a pattern that can distinguish the front and the back is projected on the ceiling to distinguish it. The IR may be designed with a pattern or operating frequency that can distinguish the direction. The marker may be distinguished using the number of IRs or the operating frequency.

The marker output unit 195 is shown as an example to be installed adjacent to the image acquisition unit in the upper surface of the main body, but this is only an example, and if the marker output unit 195 can irradiate the marker vertically toward the upward side of the main body, i.e., the ceiling from the upper surface, it can be installed any position in the upper surface without being limited to the drawings. In some cases, it is also possible to irradiate the marker toward the ceiling at a predetermined angle, but in this case, the position recognition unit calculates the position of the main body based on information about the angle at which the marker output unit irradiates the marker to the ceiling.

The marker output unit 195 basically projects a marker on the ceiling, but in some cases, it is also possible to project on a front wall or a side wall.

The change in the position or shape of the marker shown in the acquired image becomes more complicated as the degree of freedom (dof) of the part where the marker is placed increases. Accordingly, when designing the pattern of the marker, the degree of freedom of the part where the marker is placed needs to be considered.

The image acquisition unit 170 acquires an image of the front upper side according to the type and angle of view a of a lens provided thereto. When the image acquisition unit 170 is installed on the upper surface of the main body to face the upper ceiling, the image acquisition unit 170 may acquire an image of the ceiling.

The image acquisition unit 220 may include a camera, and preferably includes a digital camera capable of acquiring a digital image. In the digital camera, the optical axis O of the lens may be directed upward of the main body 10, that is, toward the ceiling. The digital camera includes at least one optical lens, an image sensor (e.g., CMOS image sensor) including a plurality of photodiodes (e.g., pixels) that are imaged by light passing through the optical lens, and a digital signal processor (DSP) that configures an image based on the signals output from the photodiodes. The digital signal processor may generate not only a still image but also a moving picture including frames composed of still images.

The position recognition unit 114 acquires position information of the marker 9 in the actual space based on the position of the marker 9 shown in the image acquired through the image acquisition unit 170, and acquires movement information of the marker 9 in the actual space based on the position change of the marker 9 shown in the image.

The position recognition unit 114 calculates the position of the target to follow, that is, the first mobile robot 11 based on the position information and the position change of the marker.

The position recognition unit 114 acquires direction information of the marker 9 based on the traveling direction of the main body 10 based on the data stored in the data unit 120. The movement information may include at least one of a change in the distance from the main body 10 to the marker 9 and a change in the movement direction of the marker 9.

The position recognition unit 114 identifies the marker based on the features of the elements constituting the marker, and determines the position based on the position, movement, and shape change of the marker in the acquired image. In addition, since the projected marker may vary depending on the environment, the shape of the marker, which is a criterion for determination, is stored as reference data and used for marker recognition during active following.

The position recognition unit 114 may acquire information on posture change of the marker 9 in the actual space based on the shape change of the marker 9 shown in the acquired image. For example, when the first mobile robot 11 climbs over an obstacle, the position of the marker may be changed due to the inclination of the main body, and when the main body is inclined, the shape of the marker may be greatly changed, and thus, based on this, position and current state of the first mobile robot may be derived.

The traveling control unit 113 sets a traveling operation or travel route through which the main body 10 may access the marker 9, i.e., the first mobile robot, based on the position information or the movement information for the marker 9 calculated by the position recognition unit 114, and sets the main body 10 to follow the first mobile robot. Since the position information may include distance information from the main body 10 to the marker 9 and/or direction information in which the marker 9 is positioned with respect to the main body 10, in the traveling operation, a distance to be moved and/or a direction to be moved by the main body 10 may be set based on the distance information and/or the direction information.

When the position of the first mobile robot is calculated by the position recognition unit 114, the traveling control unit 113 controls the traveling unit 140 by setting a movement path with the calculated position as a target point. In the case of the dry cleaning type mobile robot, it travels through the rotation of the left and right wheels, and in the case of the wet cleaning type mobile robot, it moves through the rotational motion of the rotation mop. The rotation directions of the wheels and the rotation mop are different with reference to the floor surface.

The main body 10 may be actively moved by the driving force of the motor transferred to the wheels or the rotation mop.

While traveling, the traveling control unit 113 may perform visual odometry for position correction at a predetermined period in consideration of structural characteristics of the ceiling or the wall, and compare an actual moving distance by the moving wheel or the rotation mop with a moving distance calculated from an acquired image to perform correction.

The second mobile robot may calculate the position of the first mobile robot not only using the marker but also based on the position signal of the first mobile robot.

In addition, the second mobile robot 12 may change a method of calculating a position according to a distance D1 from the first mobile robot 11 or whether a marker may be detected from the acquired image.

Figure 5:
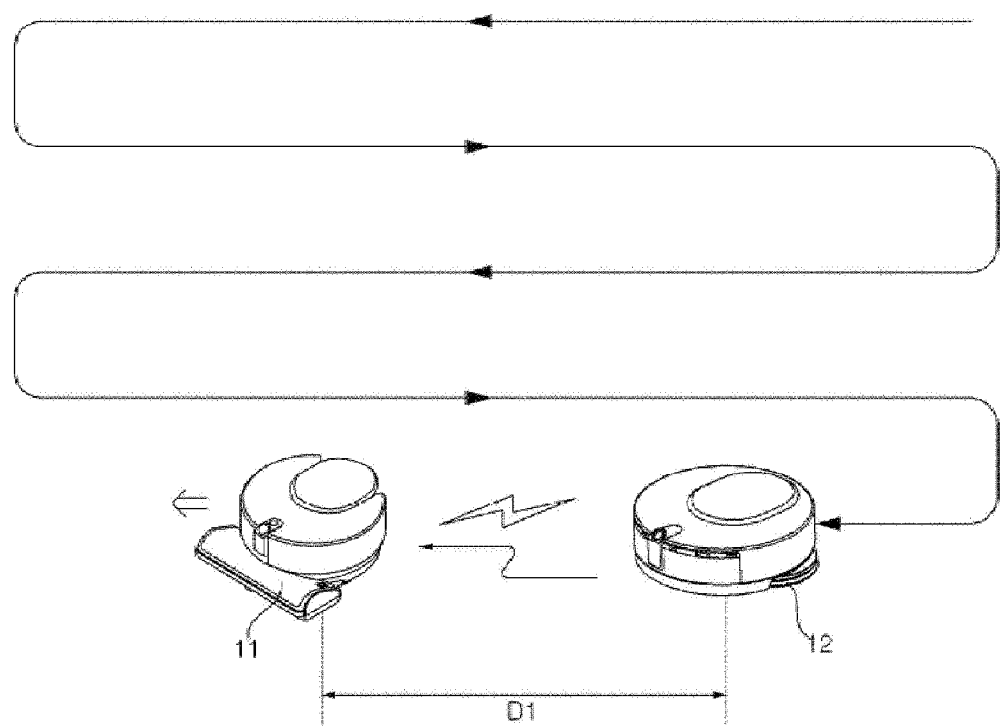
FIG. 5 is a diagram illustrating another example for explaining the operation of a plurality of mobile robots according to one embodiment of the present disclosure.

FIG. 5 is a diagram illustrating another example for explaining the operation of a plurality of mobile robots according to one embodiment of the present disclosure.

As shown in FIG. 5, the second mobile robot 12 may calculate the position of the first mobile robot 11 by receiving a position signal S transmitted from the first mobile robot 11. The second mobile robot 12 may follow the first mobile robot by deriving a distance D2 and a direction from the first mobile robot based on the position signal S.

The position signal may be transmitted in any one of an ultrasonic wave, ultra wide band (UWB), and an infrared ray, and GPS may also be used. For reference, UWB wireless technology does not use a radio carrier (RF carrier), but uses a very wide frequency band of several GHz or more in the baseband. The UWB wireless technology uses very narrow pulses of several nanoseconds or several picoseconds. Since the pulse emitted from the UWB sensor is several nanoseconds or several picoseconds, the pulse has excellent penetration, and thus the UWB sensor may receive a very short pulse emitted from other UWB sensors even if there is an obstacle in the vicinity. The UWB sensor may include a transmission unit and a reception unit as one module.

When the mobile robot moves to follow another mobile robot, each of the two mobile robots has the UWB sensor and performs wireless communication with each other. That is, the first mobile robot 11 may transmit a signal from the UWB sensor, and the second mobile robot 12 may determine the position of the first mobile robot 11 based on the position signal S received through the UWB sensor to follow the first mobile robot 11.

Since the signal of the UWB sensor may penetrate through the obstacle to be transmitted, the signal transmission is not affected by the obstacle or the like during movement. However, in the case of an obstacle of a predetermined size or more, a signal may not be transmitted or a transmission distance may be reduced even though the signal penetrates through the obstacle.

In addition, the UWB sensor provided in each of the first mobile robot and the second mobile robot measures a distance between the sensors, and thus the second mobile robot controls the traveling so that the first and second mobile robots are not separated from each other more than a preset distance while maintaining a predetermined distance according to the calculated distance.

The mobile robot may be provided with a plurality of UWB sensors. When two UWB sensors are provided, for example, they are, respectively provided on the left side and the right side of the main body to receive signals, so that it is possible to accurately calculate a position by comparing the received signals. For example, when the distances measured by the left sensor and the right sensor are different depending on the positions of the first and second mobile robots, a relative position between the first and second mobile robots and a direction of the first mobile robot may be determined based on the different measured distances.

In addition, the first mobile robot may transmit ultrasonic waves, and the second mobile robot may receive ultrasonic waves and travel to follow the first mobile robot.

Figure 6A:
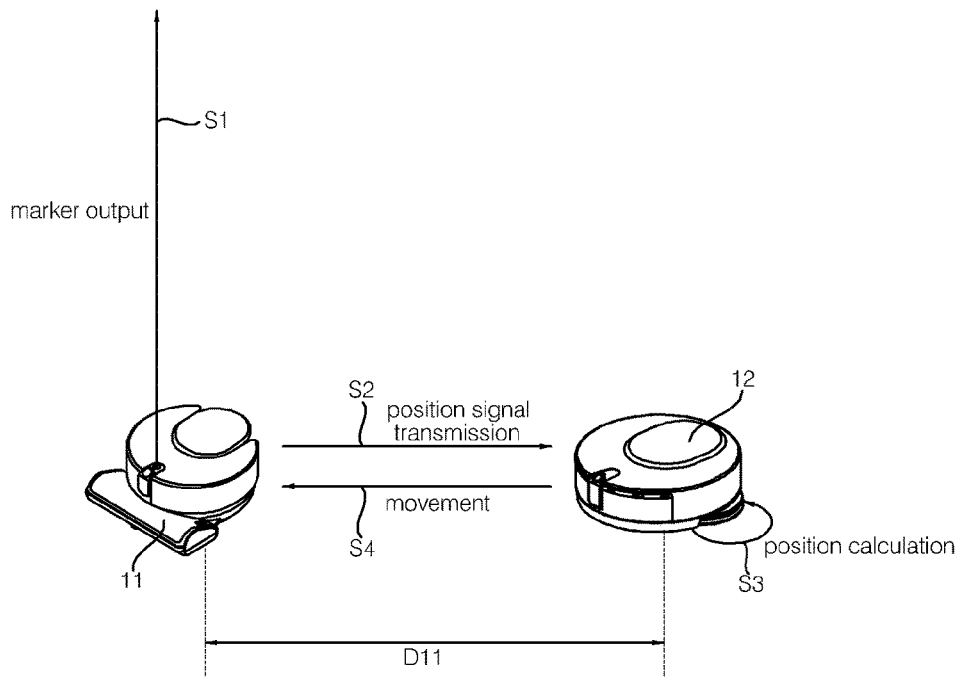
FIGS. 6A and 6B are reference diagrams for explaining an operation flow of the mobile robot with respect to FIGS. 3 and 4.
Figure 6B:
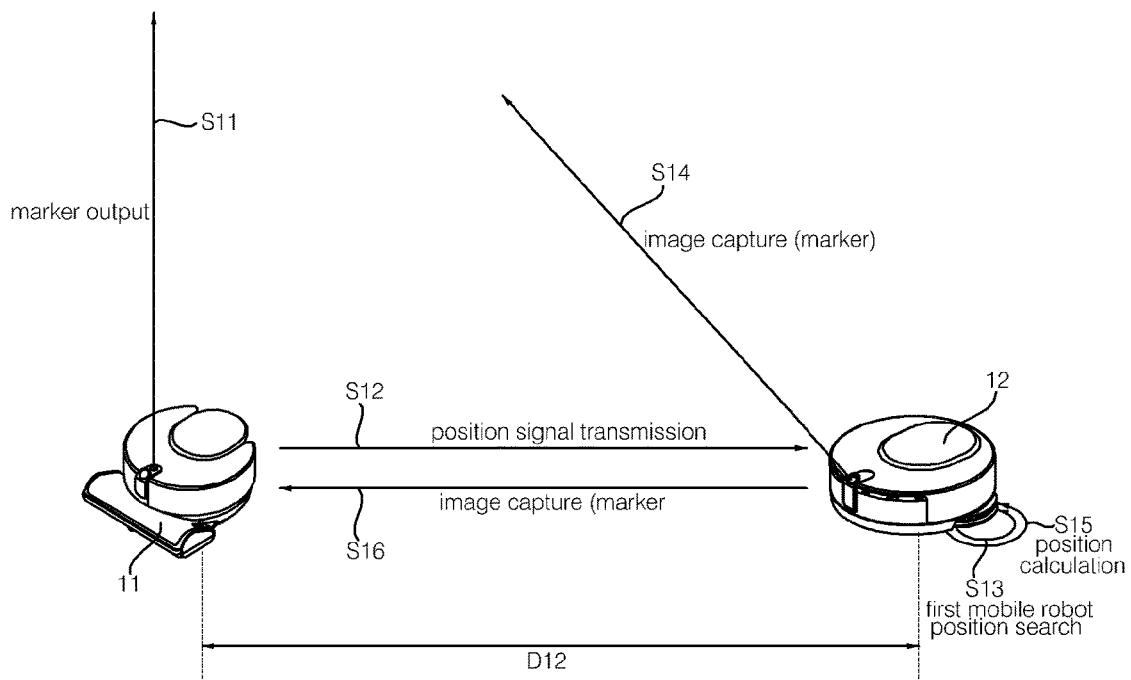

FIGS. 6A and 6B are reference diagrams for explaining an operation flow of the mobile robot with respect to FIGS. 3 and 4.

As shown in FIG. 6A, a plurality of mobile robots may each check the position of the other mobile robot using a position signal to follow the other mobile robot.

The first mobile robot 11 may output a marker toward the ceiling (S1), and also transmit a position signal (S2).

When the cooperative mode is set, the first mobile robot 11 may output the marker or the position signal.

The first mobile robot 11 may selectively perform either the output of the marker or the transmission of the position signal, and may perform both. The output of the marker and the transmission of the position signal operate regardless of the order.

The second mobile robot 12 at a position away from the first mobile robot 11 by a first distance D11 receives the position signal of the first mobile robot 11. For example, the position signal may be a UWB signal. In some cases, infrared rays or ultrasonic waves may be used for the position signal, and a GPS signal may be used.

The second mobile robot 12 calculates a position of the first mobile robot and a moving direction of the first mobile robot based on the received position signal of the first mobile robot 11, and also calculates a position change of the first mobile robot.

The second mobile robot 12 sets a target point for movement based on the position of the first mobile robot 11 and moves (S4). The second mobile robot 12 moves to follow the first mobile robot 11 so as not to be separated from the first mobile robot 11 more than a preset distance.

In addition, as shown in FIG. 6B, the second mobile robot 12 may move to follow the first mobile robot.

In the cooperative mode, the first mobile robot 11 may output a marker toward the ceiling (S11), and also transmit a position signal (S12). The position signal may be transmitted and then the marker may be output.

The second mobile robot 12 searches for a position signal of the first mobile robot 11 (S13), and when the position signal cannot be received, the second mobile robot 12 captures an image through the image acquisition unit 170.

The second mobile robot 12 extracts a marker from the obtained image and calculates a position of the first mobile robot 11 based on the marker (S15).

The second mobile robot 12 sets a target point for movement based on the position of the first mobile robot 11 to move (S16). The second mobile robot 12 moves to follow the first mobile robot 11 so as not to be separated from the first mobile robot 11 more than a preset distance.

In addition, the second mobile robot 12 may calculate the positions of the first mobile robot using the marker of the acquired image and the position signal, respectively, and compare the two position values to determine the positions of the first mobile robot.

Accordingly, the first mobile robot 11 performs cleaning while sucking foreign substances, and the second mobile robot 12 moves to follow the first mobile robot 11 and performs wet mop cleaning. That is, the second mobile robot 12 may perform a mop cleaning in an area in which dust is sucked by the first mobile robot 11 while moving along the moving trajectory of the first mobile robot.

Figure 7:
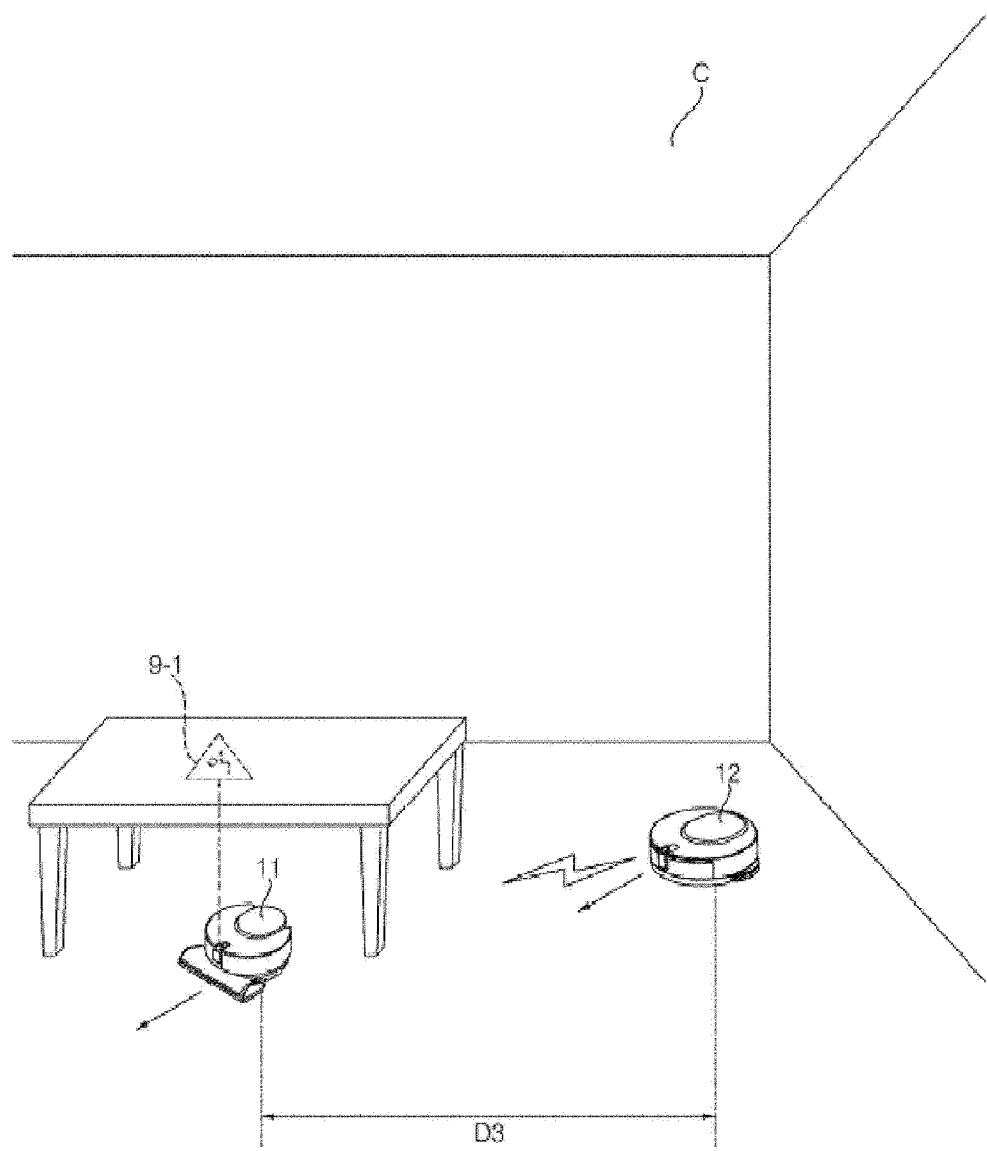
FIG. 7 is an exemplary diagram illustrating an example of a change of a position detection method for the mobile robot according to one embodiment of the present disclosure.

FIG. 7 is an exemplary diagram illustrating an example of a change of a position detection method for the mobile robot according to one embodiment of the present disclosure.

As shown in FIG. 7, when the position of the first mobile robot 11 cannot be identified, the second mobile robot 12 may track the position of the first mobile robot 11 to move by changing a method for calculating the position of the first mobile robot 11.

For example, when the first mobile robot 11 moves under furniture such as a station or a chair, the marker may not be displayed on the ceiling C, that is, a marker 9-1 may be displayed on a bottom surface of a top plate of the station.

When the marker is displayed on the bottom surface of the top plate of the station, the second mobile robot located away from the station cannot confirm the position of the first mobile robot because the marker is not included in the acquired image even if the image is captured.

The second mobile robot 12 may calculate the position of the first mobile robot by using a position signal by changing a method for searching for the position of the first mobile robot.

In addition, when a distance D3 from the first mobile robot 11 is greater than a set distance and thus cannot receive a position signal, the second mobile robot 12 may calculate a position of the first mobile robot 11 using a marker. For example, while the first mobile robot is moving, when the second mobile robot intends to return to the charging station for charging or the position of the second mobile robot is changed by a user, the second mobile robot extracts a marker from the acquired image and to calculate the position of the first mobile robot.

After the second mobile robot approaches the first mobile robot by a predetermined distance or more, the second mobile robot may follow the first mobile robot.

Meanwhile, when the marker is not included in the acquired image and the position signal is not received, the second mobile robot 12 waits for a predetermined time and then tries again. For example, when the first mobile robot located under the station gets out of the station area, the marker is displayed on the ceiling again, so that the second mobile robot can confirm the position of the first mobile robot.

When the position of the first mobile robot cannot be confirmed even after the method for calculating the position has been changed more than a set number of times, a warning may be output. In addition, the second mobile robot 12 may transmit a warning signal to the terminal or server connected through a network to output a notification regarding the inability to execute the cooperative mode.

When the second mobile robot cannot confirm the position of the first mobile robot, the second mobile robot may cancel the cooperative mode and perform autonomous traveling. When the second mobile robot detects the first mobile robot during the autonomous traveling, the second mobile robot may approach the first mobile robot and perform the cooperative mode again.

In addition, when the third mobile robot is located in the area, the second mobile robot may calculate the position of the third mobile robot to avoid collision or move to follow the third mobile robot.

Figure 8:
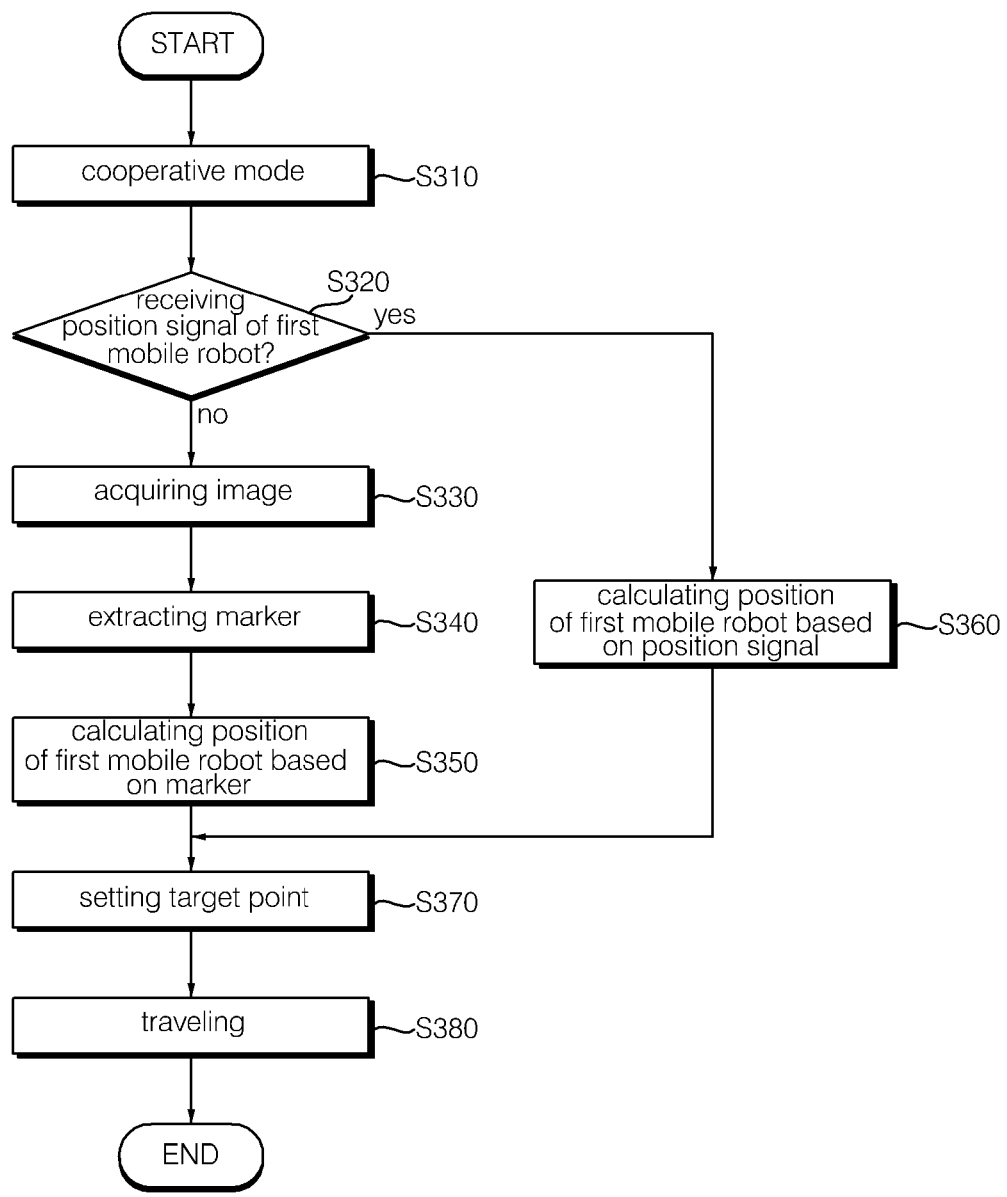
FIG. 8 is a diagram illustrating a control method for the mobile robot according to one embodiment of the present disclosure.

FIG. 8 is a diagram illustrating a control method for the mobile robot according to one embodiment of the present disclosure.

As shown in FIG. 8, when the cooperative mode is set (S310), the mobile robot 1 detects another mobile robot. In addition, the mobile robot 1 may operate in the cooperative mode when another mobile robot is detected within the area.

The first mobile robot 11 travels according to the setting, and the second mobile robot 12 detects the first mobile robot, calculates the position of the first mobile robot, and moves to follow the first mobile robot while performing a designated operation.

The first mobile robot outputs position information when the cooperative mode is set. The first mobile robot outputs a marker or transmits a position signal. Further, the first mobile robot may simultaneously output a marker and a position signal. For example, at least one of UWB, infrared ray, ultrasonic wave, and GPS may be used as the position signal.

The second mobile robot 12 searches for and receives the position signal of the first mobile robot (S320).

When the position signal of the first mobile robot is not received, the second mobile robot 12 acquires an image of the front upper side or an upper side through the image acquisition unit (S330).

The second mobile robot 12 detects the marker from the acquired image (S340), and calculates the position of the first mobile robot 11 based on the position of the marker on the ceiling (S350).

The second mobile robot 12 may calculate a position of the first mobile robot within the area as coordinates.

Meanwhile, when the position signal of the first mobile robot 11 is received, the second mobile robot 12 calculates the position of the first mobile robot using the position signal (S360).

The second mobile robot 12 sets the position of the first mobile robot as a target point (S370), moves to the target point (S380), and performs cleaning.

When the first mobile robot is a mobile robot of dry cleaning type, it moves while sucking dust, and when the second mobile robot is a mobile robot of wet cleaning type, a wet mop cleaning may be performed on the area from which dust is removed while following the first mobile robot.

When both the first and second mobile robots are dry cleaning type mobile robots or both wet cleaning type mobile robots, it is possible to effectively remove all foreign substances that are not removed during one cleaning by performing cleaning twice on the same area.

Figure 9:
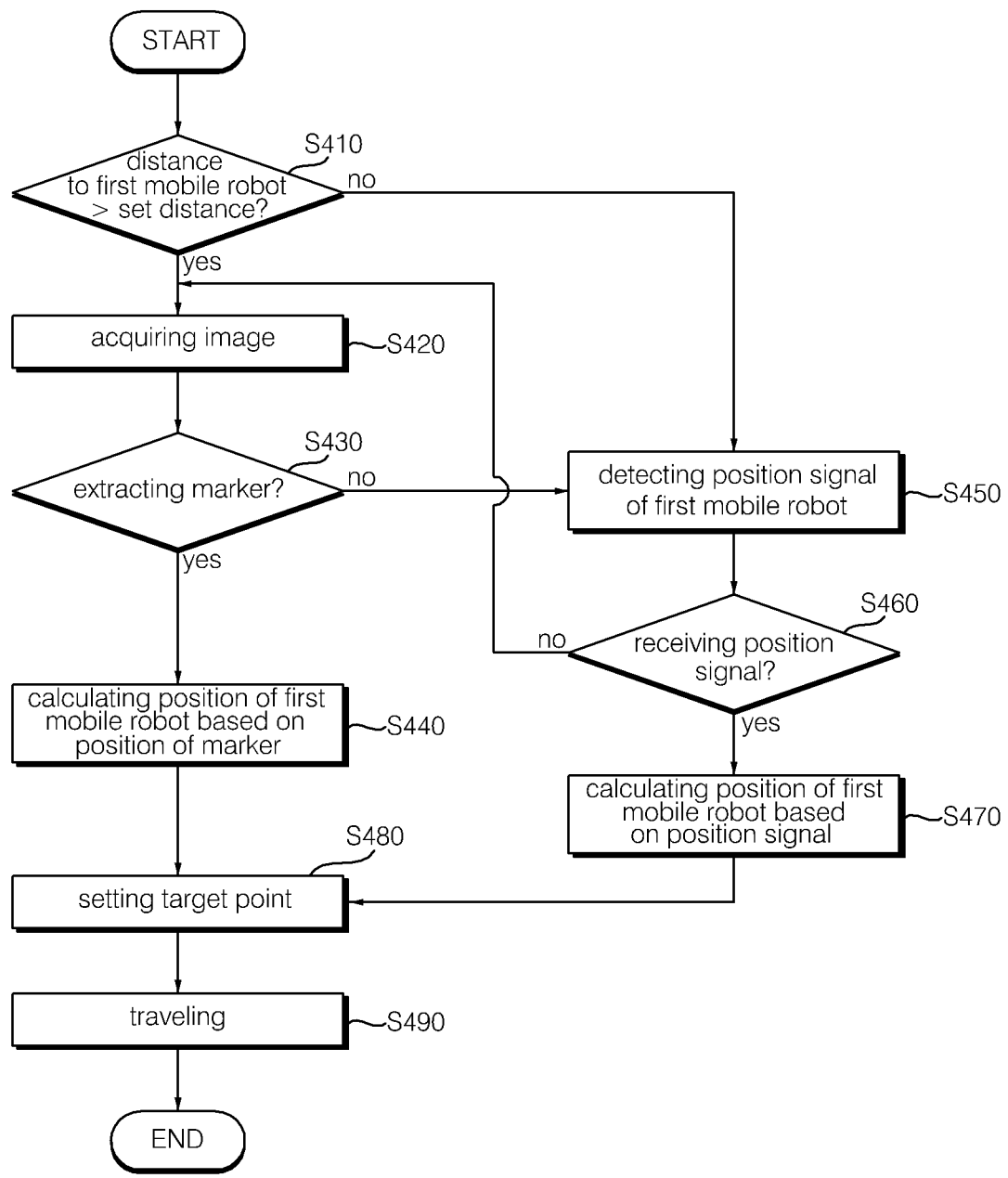
FIG. 9 is a flowchart illustrating a method of changing the position detection method for the mobile robot according to one embodiment of the present disclosure.

FIG. 9 is a flowchart illustrating a method of changing the position detection method for the mobile robot according to one embodiment of the present disclosure.

As shown in FIG. 9, when the second mobile robot 12 cannot confirm the position of the first mobile robot 11, the second mobile robot 12 may calculate the position of the first mobile robot 11 by changing a method for calculating the position of the first mobile robot 11 and move to follow the first mobile robot.

The second mobile robot 12 may not receive a position signal when the distance from the first mobile robot becomes greater than or equal to a set distance (S410).

When the position signal of the first mobile robot 11 is not received, the second mobile robot 12 captures an image through the image acquisition unit (S420) and detects a marker included in the image (S430).

When a marker is included in the image, the second mobile robot calculates a position using the marker (S440).

When a marker is not included in the image, the second mobile robot may detect the marker from the new image by capturing the image again.

The second mobile robot may detect a marker by capturing an image a predetermined number of times, and when the marker is not included in the image, the method for calculating a position may be changed from the marker to a position signal.

The second mobile robot searches for a position signal of the first mobile robot when the distance from the first mobile robot is within the set distance or when the marker is not included in the projection (S450).

For example, while the first mobile robot is moving, when the second mobile robot intends to return to the charging station for charging, or the position of the second mobile robot is changed by the user, the second mobile robot extracts a marker from the acquired image to calculate the position of the first mobile robot.

When the position signal is received (S460), the second mobile robot calculates the position of the first mobile robot according to the position signal (S470).

When the position signal is not received, the second mobile robot may recheck whether the position signal is received after waiting for a predetermined time.

When the position signal is not received, the second mobile robot may acquire an image and retry detection of the marker (S420, S430).

The second mobile robot changes the method for calculating the position depending on a distance from the first mobile robot, whether or not a position signal is received, or whether or not the marker is included in the image.

The second mobile robot may calculate the position of the first mobile robot using both methods.

When the position of the first mobile robot is calculated, the second mobile robot moves with the position of the first mobile robot as the target point, approaches the first mobile robot by a certain distance or more, and performs designated cleaning while following the first mobile robot.

The second mobile robot may output a warning when the position of the first mobile robot cannot be confirmed even after changing the method for calculating the position of the first mobile robot a set number of times or more. In addition, the second mobile robot 12 may transmit a warning signal to the terminal or server connected through a network to output a notification regarding the inability to execute the cooperative mode.

When the cooperative mode is released, the second mobile robot autonomously drives and performs designated cleaning. When the first mobile robot is detected while traveling, the second mobile robot may set the cooperative mode again.

Accordingly, the plurality of mobile robots can improve cleaning efficiency in the area through mutual cooperation.

The mobile robot according to the present embodiment operating as described above may be implemented in the form of an independent hardware device, and may be driven as at least one or more processors included in another hardware device such as a microprocessor or a general-purpose computer system.

The above description is merely illustrative of the technical spirit of the present disclosure, and various changes and modifications may be made without departing from the essential characteristics of the present disclosure by those skilled in the art to which the present disclosure pertains. Therefore, the embodiments disclosed in the present disclosure are not intended to limit the technical spirit of the present disclosure, but to explain the technical spirit of the present disclosure, and the scope of the technical spirit of the present disclosure is not limited by the embodiments.

The invention claimed is:

1. A mobile robot comprising:
a main body that travels in an area;
an image acquisition processor configured to acquire an image;
a communication processor configured to receive a position signal transmitted from a first mobile robot that the main body is configured to follow;
a control processor configured to determine a position of the first mobile robot from an image acquired by the image acquisition processor or the position signal, and configured to set a travel route with the position of the first mobile robot as a target point; and
a driving processor configured to move the main body, such that the main body follows the first mobile robot along the travel route, wherein the control processor changes a position calculation method based on a distance to the first mobile robot, and wherein the control processor determines the position of the first mobile robot from the acquired image when the distance to the first mobile robot is greater than or equal to a set distance, and when the distance to the first mobile robot is less than the set distance, the control processor receives the position signal of the first mobile robot and determines the position of the first mobile robot; and wherein the control processor extracts a marker from the acquired image, calculates the position of the marker in the area, and based on the calculation determines the position of the first mobile robot, and when a marker confirming the position of the first mobile robot is not included in the acquired image, the control processor receives the position signal of the first mobile robot by changing the position calculation method, and wherein, when the position signal is not received, the control processor changes the position calculation method, receives the acquired image and determines the position of the first mobile robot according to the position of a marker extracted from the acquired image.

2. The mobile robot of claim 1, wherein upon an occurrence of a condition that the control processor changes the position calculation method of the first mobile robot a predetermined number of times, and upon an occurrence of a condition, the control processor controls the main body, such that the main body stops following the first mobile robot and outputs a warning.

3. The mobile robot of claim 2, wherein after stopping following the first mobile robot, when the first mobile robot is detected again while traveling, the control processor controls the main body, such that the main body follows the first mobile robot.

4. The mobile robot of claim 1, wherein the control processor sets the travel route with the first mobile robot as a target point and the main body follows the first mobile robot while maintaining a predetermined distance from the first mobile robot.

5. The mobile robot of claim 1, wherein, when a cooperative mode is set, the control processor controls the main body, such that the main body follows the first mobile robot, and when the first mobile robot is detected within the area in a state where the cooperative mode is not set, the control processor sets the cooperative mode.

6. The mobile robot of claim 1, wherein the image acquisition processor acquires an image including a ceiling on which a marker output from the first mobile robot is displayed, and the position signal uses any one of UWB, ultrasonic wave, infrared ray, and GPS.

7. The mobile robot of claim 1, wherein the driving processor transmits a driving force so that a rotation mop on which a cleaning cloth is attached rotates, and the main body moves while wet cleaning a floor surface with the cleaning cloth, and in the case of following the first mobile robot, the main body moves along the travel route and wet cleans an area in which dust is sucked by the first mobile robot.

8. The mobile robot of claim 1, wherein a marker is irradiated from the first mobile robot.

* * * * *